(12) United States Patent
Jain et al.

(10) Patent No.: US 11,783,008 B2
(45) Date of Patent: Oct. 10, 2023

(54) MACHINE-LEARNING TOOL FOR GENERATING SEGMENTATION AND TOPIC METADATA FOR DOCUMENTS

(71) Applicant: Adobe Inc., San Jose, CA (US)

(72) Inventors: Rajiv Jain, Vienna, VA (US); Varun Manjunatha, Potomac, MD (US); Joseph Barrow, College Park, MD (US); Vlad Ion Morariu, Potomac, MD (US); Franck Dernoncourt, Sunnyvale, CA (US); Sasha Spala, Newton, MA (US); Nicholas Miller, Newton, MA (US)

(73) Assignee: Adobe Inc., San Jose, CA (US)

( * ) Notice: Subject to any disclaimer, the term of this patent is extended or adjusted under 35 U.S.C. 154(b) by 398 days.

(21) Appl. No.: 17/091,403

(22) Filed: Nov. 6, 2020

(65) Prior Publication Data

US 2022/0147770 A1 May 12, 2022

(51) Int. Cl.

| | | |
|---|---|---|
| *G06F 18/214* | (2023.01) | |
| *G06F 40/30* | (2020.01) | |
| *G06F 40/117* | (2020.01) | |
| *G06V 30/413* | (2022.01) | |
| *G06F 18/21* | (2023.01) | |
| *G06F 18/2415* | (2023.01) | |
| *G06F 16/33* | (2019.01) | |

(52) U.S. Cl.
CPC ........ *G06F 18/2148* (2023.01); *G06F 18/217* (2023.01); *G06F 18/2415* (2023.01); *G06F 40/117* (2020.01); *G06F 40/30* (2020.01); *G06V 30/413* (2022.01); *G06F 16/33* (2019.01); *G06V 2201/10* (2022.01)

(58) Field of Classification Search
CPC .... G06F 18/2148; G06F 40/117; G06F 40/30; G06F 18/217; G06F 18/2415; G06V 30/413; G06V 2201/10
See application file for complete search history.

(56) References Cited

U.S. PATENT DOCUMENTS

| | | | | |
|---|---|---|---|---|
| 9,519,871 | B1 * | 12/2016 | Cardonha | .............. G06F 40/247 |
| 10,258,304 | B1 * | 4/2019 | Kiraly | ...................... A61B 5/08 |

(Continued)

OTHER PUBLICATIONS

Ajideh, Schema Theory-based Pre-reading Tasks: a Neglected Essential in the ESL Reading Class, The Reading Matrix, vol. 3, No. 1, Apr. 2003, 14 pages.

(Continued)

*Primary Examiner* — Kevin Ky
(74) *Attorney, Agent, or Firm* — Kilpatrick Townsend & Stockton LLP

(57) ABSTRACT

Certain embodiments involve using a machine-learning tool to generate metadata identifying segments and topics for text within a document. For instance, in some embodiments, a text processing system obtains input text and applies a segmentation-and-labeling model to the input text. The segmentation-and-labeling model is trained to generate a predicted segment for the input text using a segmentation network. The segmentation-and-labeling model is also trained to generate a topic for the predicted segment using a pooling network of the model to the predicted segment. The output of the model is usable for generating metadata identifying the predicted segment and the associated topic.

20 Claims, 11 Drawing Sheets

(56) References Cited

U.S. PATENT DOCUMENTS

| | | | | |
|---|---|---|---|---|
| 2015/0310344 | A1* | 10/2015 | Gunjan | G06Q 50/01 |
| | | | | 706/52 |
| 2015/0356571 | A1* | 12/2015 | Chang | G06Q 30/0201 |
| | | | | 705/7.29 |
| 2020/0293921 | A1* | 9/2020 | Huang | G06F 16/5846 |
| 2021/0201013 | A1* | 7/2021 | Makhija | G06V 30/414 |
| 2021/0216862 | A1* | 7/2021 | Liu | G06N 3/08 |
| 2022/0147770 | A1* | 5/2022 | Jain | G06F 40/30 |

OTHER PUBLICATIONS

Allan et al., Topic Detection and Tracking Pilot Study Final Report, Proceedings of the DARPA Broadcast News Transcription and Understanding Workshop, Feb. 1998, 25 pages.

Arnold et al., A Neural Model for Coherent Topic Segmentation and Classification, Transactions of the Association for Computational Linguistics, vol. 7, Feb. 13, 2019, pp. 169-184.

Ballesteros et al., Training with Exploration Improves a Greedy Stack LSTM Parser, Association for Computational Linguistics, Nov. 2016, pp. 2005-2010.

Beeferman et al., Statistical Models for Text Segmentation, Machine Learning, vol. 34, No. 1-3, 1999, pp. 177-210.

Bojanowski et al., Enriching Word Vectors with Subword Information, arXiv preprint arXiv:1607.04606, vol. 5, Jun. 19, 2017, 12 pages.

Chen et al.. Content Modeling Using Latent Permutations, of Artificial Intelligence Research, vol. 36, 2009, pp. 129-163.

Choi, Advances in Domain Independent LinearText Segmentation, Proceedings of the 1st North American chapter of the Association for Computational Linguistics Conference, Apr. 2000, pp. 26-33.

Devlin et al., BERT: Pre-Training of Deep Bidirectional Transformers for Language Understanding, In Proceedings of the 2019 Conference of the North American Chapter of the Association for Computational Linguistics: Human Language Technologies, vol. 1, May 24, 2019, pp. 4171-4186.

Edinger et al., Evaluation of Clinical Text Segmentation to Facilitate Cohort Retrieval, Archive of AMIA Annual Symposium Proceedings, Apr. 16, 2018, pp. 660-669.

Eisenstein et al., Bayesian Unsupervised Topic Segmentation, In Proceedings of the Conference on Empirical Methods in Natural Language Processing, Oct. 2008, pp. 334-343.

Ganesan et al., A General Supervised Approach to Segmentation of Clinical Texts, IEEE International Conference on Big Data (Big Data), Oct. 27-30, 2014, pp. 33-40.

Glavas et al., Unsupervised Text Segmentation Using Semantic Relatedness Graphs, Proceedings of the Fifth Joint Conference on Lexical and Computational Semantics, Aug. 2016, pp. 125-130.

Glorot et al., Understanding the Difficulty of Training Deep Feedforward Neural Networks, Proceedings of the Thirteenth International Conference on Artificial Intelligence and Statistics, PMLR 9, Jan. 2010, pp. 249-256.

Goodman, Parsing Algorithms and Metrics, In Proceedings of the 34th Annual Meeting on Association for Computational Linguistics, Jun. 1996, pp. 177-183.

Hearst et al., Subtopic Structuring for Full-length Document Access, Proceedings of the 16th Annual International ACM SIGIR Conference on Research and Development in Information Retrieval, Jul. 1993, pp. 59-68.

Hearst, TextTiling: Segmenting Text into Multi-Paragraph Subtopic Passages, Computational Linguistics, vol. 23, No. 1, Mar. 1997, pp. 33-64.

Howard et al., Universal Language Model Fine-Tuning for Text Classification, Proceedings 56th Annual Meeting Association for Computational Linguistics, May 23, 2018, 12 pages.

Kingma et al., ADAM: A Method for Stochastic Optimization, International Conference on Learning Representations, arXiv preprint arXiv:1412.6980, Jan. 30, 2017, 15 pages.

Koshorek et al., Text Segmentation as a Supervised Learning Task, Proceedings of the 2018 Conference of the North American Chapter of the Association for Computational Linguistics: Human Language Technologies, vol. 2 (Short Papers), Jun. 2018, pp. 469-473.

Lample et al., Neural Architectures for Named Entity Recognition, Proceedings of the 2016 Conference of the North American Chapter of the Association for Computational Linguistics: Human Language Technologies, Jun. 2016, pp. 260-270.

McCallum et al., Early Results for Named Entity Recognition with Conditional Random Fields, Feature Induction and Web-enhanced Lexicons, Proceedings of the Seventh Conference on Natural Language Learning at HLT-NAACL, 2003, pp. 188-191.

Nguyen et al., SITS : A Hierarchical Nonparametric Model Using Speaker Identity forTopic Segmentation in Multiparty Conversations, Proceedings of the 50th Annual Meeting of the Association for Computational Linguistics (vol. 1: Long Papers), Jul. 2012, pp. 78-87.

Och, Minimum Error Rate Training in Statistical Machine Translation, Proceedings of the 41st Annual Meeting of the Association for Computational Linguistics, Jul. 2003, pp. 160-167.

Peters et al., Deep Contextualized Word Representations, Proceedings of the 2018 Conference of the North American Chapter of the Association for Computational Linguistics: Human Language Technologies, vol. 1, Jun. 2018, pp. 2227-2237.

Peters et al., ELMo, North American Chapter of the Association for Computational Linguistics, Document retrieved from: https://allennlp.org/elmo, 2018, 3 pages.

Pomares-Quimbaya et al., Current Approaches to Identify Sections Within Clinical Narratives from Electronic Health Records: A Systematic Review, BMC Medical Research Methodology, vol. 19, No. 1, Jul. 2019, 21 pages.

Ramshaw et al., Text Chunking Using Transformation-based Learning, Natural Language Processing Using Very Large Corpora, Dec. 2002, pp. 157-176.

Riedl et al., Topictiling: A Text Segmentation Algorithm Based on Lda, Proceedings of ACL 2012 Student Research Workshop, Jul. 2012, pp. 37-42.

Sadoughi et al., Detecting Section Boundaries in Medical Dictations: Toward Real-time Conversion of Medical Dictations to Clinical Reports, International Conference on Speech and Computer, Jan. 2018, pp. 563-573.

Srivastava et al., Dropout: A Simple Way to Prevent Neural Networks from Overfitting, Journal of Machine Learning Research, vol. 15, No. 1, Jun. 2014, pp. 1929-1958.

Swaffar et al., Reading for Meaning: An Integrated Approach to Language Learning, Jan. 1991, 137 pages.

Tepper et al., Statistical Section Segmentation in Free-text Clinical Records, Proceedings of the Eighth International Conference on Language Resources and Evaluation (LREC'12), May 2012, pp. 2001-2008.

Wang et al., Learning to Rank Semantic Coherence for Topic Segmentation, Proceedings of the 2017 Conference on Empirical Methods in Natural Language Processing, Sep. 2017, pp. 1340-1344.

Williams et al., A Learning Algorithm for Continually Running Fully Recurrent Neural Networks, Neural Computation, vol. 1, No. 2, Jun. 1989, pp. 270-280.

Sehikh, Imran, et al., Topic Segmentation in ASR Transcripts Using Bidirectional RNNS for Change Detection, IEEE Automatic Speech Recognition and Understanding Workshop, Dec. 2017, pp. 1-8.

* cited by examiner

200

202 — Provide input text to a segmentation-and-labeling model having a segmentation network and a pooling network

204 — Generate a predicted segment for the input text by, at least, applying the segmentation network to an encoded text portion set from the input text

206 — Generate a topic for the predicted segment by, at least, applying the pooling network to the predicted segment

208 — Generate an output document having the input text, segment metadata identifying the predicted segment, and topic metadata identifying the topic

FIG. 2

| WikiSection-topics single-label classification | en_disease 27 topics | | | de_disease 25 topics | | | en_city 30 topics | | | de_city 27 topics | | |
|---|---|---|---|---|---|---|---|---|---|---|---|---|
| model configuration | ↓$P_k$ | ↑$F_1$ | ↑MAP | ↓$P_k$ | ↑$F_1$ | ↑MAP | ↓$P_k$ | ↑$F_1$ | ↑MAP | ↓$P_k$ | ↑$F_1$ | ↑MAP |
| C99 | 37.4 | n/a | n/a | 42.7 | n/a | n/a | 36.8 | n/a | n/a | 38.3 | n/a | n/a |
| TopicTiling | 43.4 | n/a | n/a | 45.4 | n/a | n/a | 30.5 | n/a | n/a | 41.3 | n/a | n/a |
| TextSeg | 24.3 | n/a | n/a | 35.7 | n/a | n/a | 19.3 | n/a | n/a | 27.5 | n/a | n/a |
| SEC>T+emb | 26.3 | 55.8 | 69.4 | 27.5 | 48.9 | 65.1 | 15.5 | 71.6 | 81.0 | 16.2 | 71.0 | 81.1 |
| LSTM-LSTM-CRF | 23.9 | 57.2 | n/a | 23.6 | 51.4 | n/a | 9.7 | 77.5 | n/a | 10.2 | 74.0 | n/a |
| S-LSTM | 20.0 | 59.3 | 72.4 | 18.8 | 55.6 | 69.0 | 9.1 | 76.1 | 83.5 | 9.5 | 76.5 | 84.5 |

Table 1

FIG. 9

| WikiSection-headings multi-label classification | en_disease 179 topics | | | de_disease 115 topics | | | en_city 608 topics | | | de_city 318 topics | | |
|---|---|---|---|---|---|---|---|---|---|---|---|---|
| model configuration | ↓ $P_k$ | ↑ Prec@1 | ↑ MAP | ↓ $P_k$ | ↑ Prec@1 | ↑ MAP | ↓ $P_k$ | ↑ Prec@1 | ↑ MAP | ↓ $P_k$ | ↑ Prec@1 | ↑ MAP |
| C99 | 37.4 | n/a | n/a | 42.7 | n/a | n/a | 36.8 | n/a | n/a | 38.3 | n/a | n/a |
| TopicTiling | 43.4 | n/a | n/a | 45.4 | n/a | n/a | 30.5 | n/a | n/a | 41.3 | n/a | n/a |
| TextSeg | 24.3 | n/a | n/a | 35.7 | n/a | n/a | 19.3 | n/a | n/a | 27.5 | n/a | n/a |
| SEC>H+emb | 30.7 | 50.5 | 57.3 | 32.9 | 26.6 | 36.7 | 17.9 | 72.3 | 71.1 | 19.3 | 68.4 | 70.2 |
| S-LSTM | 19.8 | 53.5 | 60.3 | 18.6 | 36.2 | 46.1 | 9.0 | 73 | 71.3 | 8.2 | 74.1 | 75.1 |
| S-LSTM, -expl | 20.8 | 52.1 | 59 | 19.1 | 34.7 | 44.8 | 9.2 | 72.7 | 70.8 | 8.5 | 73.8 | 74.4 |
| S-LSTM, -expl, -pool | 21.2 | 52.3 | 59.5 | 19.8 | 34.4 | 45 | 10.4 | 69.7 | 67.2 | 10.2 | 64.1 | 66.7 |

Table 2

FIG. 10

MACHINE-LEARNING TOOL FOR GENERATING SEGMENTATION AND TOPIC METADATA FOR DOCUMENTS

TECHNICAL FIELD

This disclosure relates generally to machine-learning systems that facilitate predictions based on user inputs. More specifically, but not by way of limitation, this disclosure relates to using a machine-learning tool to generate document metadata identifying segments and topics for text within a document.

BACKGROUND

Software tools for editing, viewing, or otherwise using electronic documents are more effective when used with structured documents. One type of structure is the grouping of content into topically coherent segments. For instance, electronic documents often include metadata that explicitly identifies a segment for a given portion of text.

Machine learning algorithms are often used to segment a document by uncovering latent, topically coherent segments of text. Some of these techniques involve predicting topics per text portion (e.g., per sentence) and using measures of topical coherence for segmentation of the document once the topics are identified. Examples of this approach include using term co-occurrences, cue phrases, and coherence shifts to find coherent segments in a document. But these techniques often result less useful segmentation, such as by assigning different paragraphs with slight variation on a topic to multiple different segments rather than grouping the paragraphs into one common segment, or inaccurate segmentation or topic labeling. These ineffective segmentation and topic labeling approaches can degrade the performance of software tools, such as text editors or ereaders, that rely on segmentation to automate editing of documents or to provide navigable interface elements for moving between different document sections.

SUMMARY

Certain embodiments involve using a machine-learning tool to generate document metadata identifying segments and topics for text within a document. For instance, in some embodiments, a text processing system obtains input text and applies a segmentation-and-labeling model to the input text. The text processing system generates a predicted segment for the input text by, for example, applying a segmentation network of the model to an encoded text portion set from the input text. The text processing system generates a topic for the predicted segment by, for example, applying a pooling network of the model to the predicted segment. The text processing system generates an output document having the input text along with metadata identifying the predicted segment and the associated topic.

These illustrative embodiments are mentioned not to limit or define the disclosure, but to provide examples to aid understanding thereof. Additional embodiments are discussed in the Detailed Description, and further description is provided there.

BRIEF DESCRIPTION OF THE DRAWINGS

Features, embodiments, and advantages of the present disclosure are better understood when the following Detailed Description is read with reference to the accompanying drawings.

FIG. 2 depicts an example of a process for using a machine-learning tool to generate document metadata identifying segments and topics for text within a document, according to certain embodiments described in the present disclosure.

FIG. 9 depicts an example of experimental results generated using certain embodiments described in the present disclosure.

FIG. 10 depicts an example of experimental results generated using certain embodiments described in the present disclosure.

DETAILED DESCRIPTION

Figure 1:
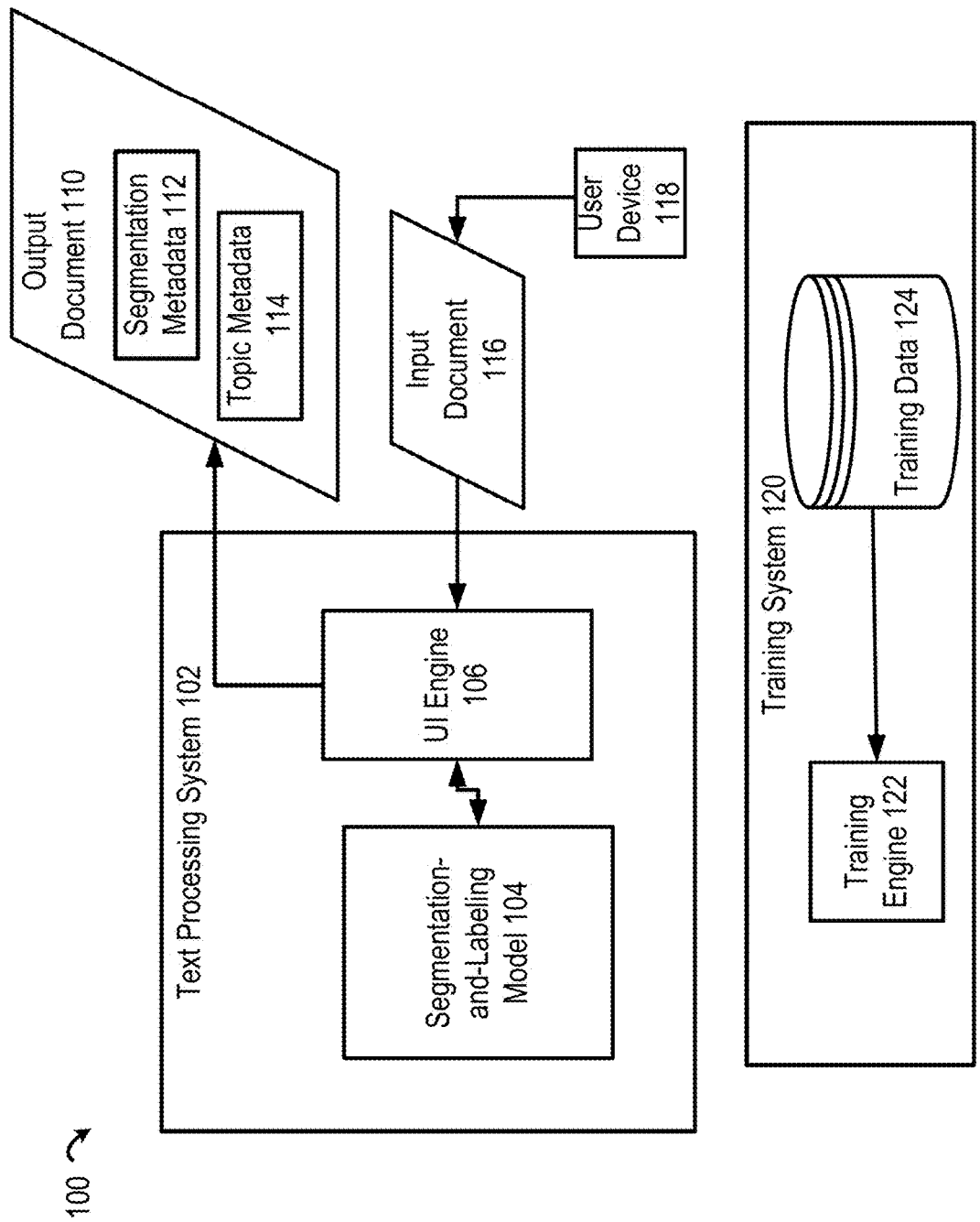
FIG. 1 depicts an example of a computing environment in which a text-processing system uses a machine-learning tool to generate metadata identifying segments and topics for text within a document, according to certain embodiments described in the present disclosure.

Certain embodiments involve using a machine-learning tool to generate document metadata identifying segments and topics for text within a document. For instance, a segmentation-and-labeling model uses a segmentation network connected to a pooling network to jointly segment input text from a document and apply topic labels to the segments. The resultant segmentation and labeling provided by certain embodiments reduces errors in segmentation and thereby improving the accuracy of topic labels generated for the document.

The following non-limiting example is provided to introduce certain embodiments. In this example, a text processing system provides input text, such as an unstructured document, to a segmentation-and-labeling model. For instance, the segmentation-and-labeling model could be included in, or accessible to, a text-editing tool or other content creation tool. The text-editing tool or other content creation tool obtains the input text from a document that lacks metadata identifying different sections of the input text.

The text processing system applies a segmentation network of the segmentation-and-labeling model to encoded sentence set in the document. A sentence set includes one or more sentences or other text portions, and an encoded sentence set is a set of one or more vector representations of these sentences or other text portions. The segmentation network, such as a bidirectional long short-term memory ("LSTM") network, identifies segments within the text. For instance, the segmentation network could output a set of tags identifying certain sentence in a sentence set as the beginning of a segment and subsequent sentence in the sentence set as the continuation of the segment.

Continuing with this example, the text processing system also applies a pooling network to one or more predicted segments generated by the segmentation network. For instance, the text processing system identifies, using the set of tags outputted by the segmentation network, a set of encoded sentences as a segment. The text processing system provides the identified set of encoded sentences as an input sequence to an LSTM used to implement the pooling network. The pooling network generates a topic for the predicted segment by generating an output vector. A non-limiting example of the output vector is a vector identifying a bag-of-terms that is representative of the semantic content of the segment. The text processing system uses the bag-of-terms from the output vector as a topic for the segment or derives the topic for the segment from the bag-of-terms from the output vector as a topic for the segment.

The text processing system generates an output document having the input text as well as segment metadata identifying the predicted segments and topic metadata identifying the topics. The metadata could be used, for example, to generate interface elements (e.g., bookmarks) for navigating to different document sections and displaying topics for those document sections. By segmenting and labeling the document with the segmentation and pooling network, the text processing system expands the available functions that a software tool can perform with respect to the document.

Thus, certain embodiments provide improvements to software tools that use machine-learning models for modifying or otherwise processing digital text content. For instance, embodiments described herein can facilitate an automated process for distinguishing and identifying segments within a document more effectively than existing techniques. In particular, utilizing a segmentation network following by a pooling network leverages the presence of complementary supervisory signals for segmentation and topic inference, as well as considering the contribution of multiple sentences (or other text portions) in a segment to the segment label. These features allow various embodiments herein to more effectively segment electronic documents, thereby reducing manual, subjective efforts involved with segmenting unstructured text more effectively than conventional techniques.

Examples of Using Machine Learning Model to Jointly Segment and Label Text

Referring now to the drawings, FIG. 1 depicts an example of a computing environment 100 in which a machine-learning tool generates metadata for documents identifying segments and topics for text within the documents. In various embodiments, the computing environment 100 includes one or more of a text-processing system 102 and a training system 120.

The text-processing system 102 includes one or more computing devices that execute program code providing a text-processing software tool. The text-processing system 102, as illustrated in FIG. 1, includes a segmentation-and-labeling model 104 and a user interface engine 106.

The text-processing system 102 uses the segmentation-and-labeling model 104 to compute predicted segments and topic labels for the input text. In some embodiments, the segmentation-and-labeling model 104 is a Segment Pooling LSTM (S-LSTM) that jointly segments a document or other input text and labels segments of the document or input text with topics. For instance, the text-processing system 102 accesses, as an input, an input document 116 that is provided by a user device 118 or otherwise identified using a user device 118. The text-processing system 102 applies the segmentation-and-labeling model 104 to the input document. The segmentation-and-labeling model 104 includes a first neural network model or subnet, such as a segment proposal LSTM, for identifying segments from encoded sentences that are generated from the input text. The segmentation-and-labeling model 104 also includes a second neural network model or subnet, such as a segment pooling layer, that receives segments from the first neural network model or subnet and identifies one or more labels identifying one or more topics for a given segment. In some embodiments, the segmentation-and-labeling model 104 also includes one or more modules (e.g., separate neural networks models or subnets of a neural network model) that generate word embeddings (e.g., vector representations of the words in the input text) and encoded sentences (e.g., vector representations of the sentences or other text segments in the input text). The outputs of the segmentation-and-labeling model 104 identify one or more segments and one or more topics in the input text.

The text-processing system 102 transforms the input document 116 into an output document 110 by generating metadata from these model outputs and applying the metadata to the input document. For instance, the output document 110 could include segmentation metadata 112 identifying the predicted segments and topic metadata 114 identifying the predicted segment topics. The output document 110 represents a segmented and labeled version of the input text. Examples of topics include history and geography. In some embodiments, the text-processing system 102 outputs the output document 110 with topic metadata 114 identifying multiple topics for a segment.

Such segmented output documents have many uses across various domains and downstream tasks. For instance, topically segmented documents are useful for pre-reading (the process of skimming or surveying a text prior to careful reading), thus serving as an aid for reading comprehension Segmentation can also be used to convert unstructured medical dictations into clinical reports, which in turn could help with medical coding (since a diagnosis mentioned in a "Medical History" might be different from a diagnosis mentioned in an "Intake" section). Segmented documents can also be used downstream in retrieval applications, where it can be particularly useful when applied to informal text or speech that lacks explicit segment markup.

The segmentation-and-labeling model 104 includes a trained neural network or a set of trained neural networks. In some embodiments, the training system 120 facilitates training of the segmentation-and-labeling model 104 used by the text-processing system 102. As illustrated in FIG. 1, the training system 120 includes a training engine 122 and training data 124. In some embodiments, the training engine 122 takes the training data 124 as an input and outputs a trained model relating to the training data 124. For example, the training data 124 includes text inputs and ground truth inputs, such as annotations or other data indicating how the text inputs are segmented and how the segments are labeled. This training data 124 is input into the training engine 122, and the training engine 122 trains a model that involves mapping the text inputs and the segments and topics. The training system 120 provides the trained model to the text-processing system 102. Examples of training the segmentation-and-labeling model 104 are described herein with respect to FIG. 5.

The text-processing system 102 communicates with a user device 118 via a user interface engine 106. The user interface engine 106 executes program code that provides a graphical interface to a user device 118 for display. The user interface engine 106 also executes program code that receives input, such as the input document 116, via such a graphical interface and provides the input to the segmentation-and-labeling model 104. The user interface engine 106 also executes program code that generates outputs, such as visual indicators of the segmentation metadata 112, the topic metadata 114, or both. For instance, the user interface engine 106 could use the segmentation metadata 112 to generate a set of bookmarks or other interface elements for navigating to specific segments within the output document 110. The user interface engine 106 could use the topic metadata 114 to generate visual indicators (e.g., names, colors) for distinguishing the bookmarks or other interface elements from one another. The user interface engine 106 updates the graphical interface to include these or other visual indicators of the segmentation metadata 112, the topic metadata 114, or both.

The user interface engine 106 includes one or more elements for identifying the input document 116 to the text-processing system 102. In one example, the user interface engine 106 provides a graphical interface with an input element configured for uploading the input document from a memory device on the user device 118 to the text-processing system 102. In another example, the user interface engine 106 provides a graphical interface with an input element configured for identifying a location, such as a web link or other network or memory address, from which the text-processing system 102 can retrieve the input document. In another example, the user interface engine 106 provides a graphical interface, such as a text-editing field, that receives input text and thereby creates an input document 116.

FIG. 2 depicts an example of a process 200 for using a machine-learning tool to generate document metadata identifying segments and topics for text within a document. In some embodiments, one or more computing devices implement operations depicted in FIG. 2 by executing suitable program code (e.g., code implementing the segmentation-and-labeling model 104). For illustrative purposes, the process 200 is described with reference to certain examples depicted in the figures. Other implementations, however, are possible. Furthermore, while the description of FIG. 2 and other figures providing further details of the segmentation and labeling model refers to sentences as examples of text portions, any suitable text portion (e.g., a phrase, a paragraph, etc.) could be encoded, and the encoded version of that text portion can be provided as an input to a segmentation network and a pooling network.

At block 202, the process 200 involves the text-processing system 102 providing input text to a segmentation-and-labeling model 104 having a segmentation network and a pooling network. For instance, as described above with respect to FIG. 1, the text-processing system 102 could access an input document 116 that is identified via user inputs to a graphical interface provided by the user interface engine 106. The text-processing system 102 provides this input document to one or more software modules that create word embeddings from the input text and that create encoded sentences from the word embeddings. For example, the segmentation-and-labeling model 104 (or another software tool) could include a sentence encoder that generates the word embeddings and the encoded sentences. An example of such a sentence encoder is an LSTM with concat pooling, although any suitable sentence encoder may be used. The text-processing system 102 provides the encoded sentences to an input layer of the segmentation-and-labeling model 104.

One or more operations in blocks 204 and 206 implement a step for jointly segmenting and labeling input text to generate an output document with metadata identifying one or more segments and one or more topics. For example, at block 204, the process 200 involves the text-processing system 102 generating a predicted segment for the input text. For instance, the segmentation-and-labeling model 104 applies the segmentation network to an encoded sentence set (or other encoded text portion set) from the text input. In some embodiments, the segmentation network is a bidirectional LSTM. This bidirectional LSTM (or other suitable segmentation network) tags each encoded sentence in a set of encoded sentences as a beginning of a predicted segment or as an inside of a predicted segment. For example, a B tag indicates the encoded sentence set is a beginning of a predicted segment and an I tag indicates a second encoded sentence set is inside the predicted segment. Examples of generating the predicted segment are described herein with respect to FIG. 3.

At block 206, the process 200 involves the text-processing system 102 generating a topic for the predicted segment by, at least, applying the pooling network to the predicted segment. In some embodiments, the pooling network is a concat pooling LSTM. The concat pooling LSTM (or other suitable pooling network) receives an encoded sentence set as an input. The pooling network pools over segments from an encoded sentence set and classifies the segments by computed predicted topics for the segments. For instance, the pooling network generates, for a given segment, an output vector representing a semantic meaning of the encoded sentence set. Examples of the output vector include a Bag-of-Words vector a topic distribution vector indicating probabilities of the segment being associated respective topics, a vector indicating probabilities of the segment belonging to respective classes.

In some embodiments, the pooling network groups an encoded sentence set as a segment using the set of B and I tags generated by the segmentation network. In a simplified example, the pooling network determines that a first encoded sentence has a B tag. The pooling network treats a subsequently encountered encoded sentence having an I tag as part of the same segment as the first encoded sentence. For instance, if a first encoded sentence has a B tag and a second encoded sentence following the first encoded sentence has an I tag, without any intervening encoded sentences having a B tag, then the pooling network applies a pooling function to the first and second encoded sentences to generate a topic label for a segment that includes the first and second encoded sentences. The pooling network then encounters an encoded sentence having a different B tag, which indicates that the this encoded sentence is the beginning of a different segment. The pooling network excludes the encoded sentence having the different B tag from a pooling function that generates the output vector.

As an illustrative example, a set of input text could include the following seven sentences: "This is the first segment. This is also the first segment. And this is the first segment . . . . This is the second segment. And this is the second segment . . . . This is the third segment. Here is another sentence in the third segment." In this example, ellipses are used to indicate different segments. The segmentation network receives a set of encoded sentences $\{S_1 \ldots S_7\}$, where $S_1$ is the encoded version of the sentence "This is the first segment," $S_2$ is the encoded version of the sentence "This is also the first segment," and so on. The segmentation network generates a set of I and B tags, where encoded sentences $S_1$ ("This is the first segment"), $S_4$ ("This is the second segment"), and $S_6$ ("This is the third segment") have B tags indicating that these sentences begin different segments. The other encoded sentences have I tags indicating that they continue a segment. For instance, encoded sentences $S_1$, $S_2$, and $S_3$ respectively have a B tag, a first I tag, and a second I tag, thereby indicating that a given segment begins with $S_1$ and includes $S_2$ and $S_3$.

In this example, the text-processing system 102 uses the I and B tags to organize the encoded sentences into input sequences for the poling network. An input sequence includes t samples, where the value of t for a given input sequence is the number of sentences in a given predicted segment. For instance, a first input sequence would include the encoded sentences $S_1$, $S_2$, and $S_3$, a second input sequence would include the encoded sentences $S_4$, and $S_5$, and a third input sequence would include the encoded sentences $S_6$, and $S_7$. The text-processing system 102 generates a first instance of the pooling network and applies the first instance of the pooling network to the first input sequence to generate one or more labels for the segment to which the sentences of the first input sequence are assigned. The text-processing system 102 repeats this process for the second and third input sequences.

The segmentation-and-labeling model applies a classifier to the output vector to generate a distribution of probabilities for the output vector having subject matter included in respective topics. The segmentation-and-labeling model selects one or more topics based on a one or more probabilities for the one or more topics exceeding a threshold. Additional examples of generating the predicted topic are described herein with respect to FIGS. 3 and 4.

At block 208, the process 200 involves the text-processing system 102 generating an output document having the input text, segmentation metadata identifying the predicted segment, and topic metadata identifying the topic. For example, the text-processing system 102 could update the input text to include the segmentation metadata and topic metadata as tags. The input text with the tags is the output document. Updating the input text in this manner facilitates, for example, efficient scanning of the output document to locate segments of interest. Examples of implementing the operations in block 208 are provided herein with respect to FIG. 3.

Figure 3:
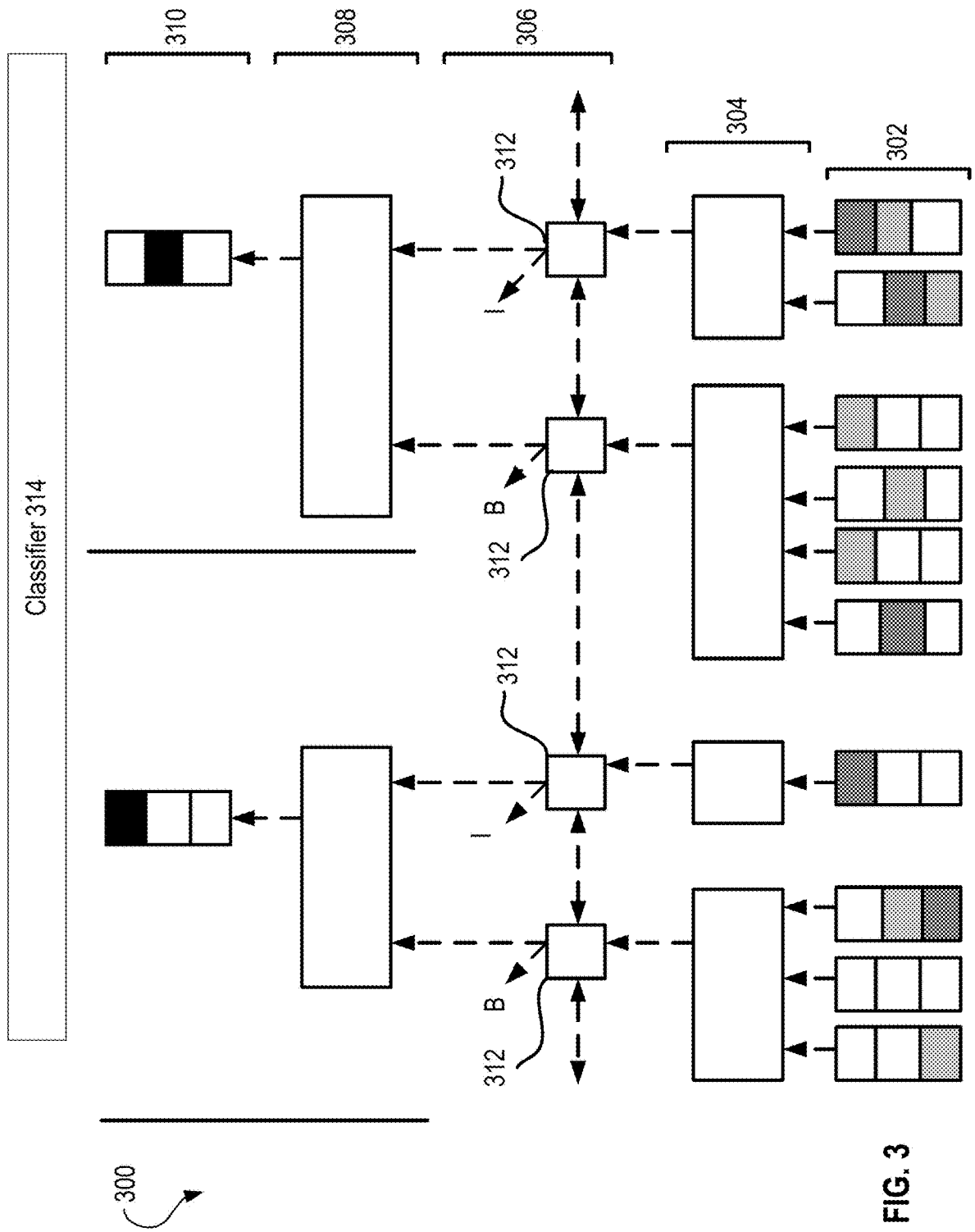
FIG. 3 depicts an example of a segmentation-and-labeling model used by the process of FIG. 2, according to certain embodiments described in the present disclosure.

FIG. 3 depicts an example of a segmentation-and-labeling model 300 that the text-processing system 102 uses to generate a segmented and labeled output document 310 from a set of input text 302. The segmentation-and-labeling model 300 includes a sentence encoder 304, a segment predictor LSTM 306, and a pooling network 308. The set of input text 302 includes words of a document to be segmented and labeled.

In this example, the segmentation-and-labeling model 300 is an S-LSTM that is trained to predict segment bounds and to classify the predicted segments into one or more topics. The segmentation-and-labeling model 300 performs segmentation and labeling jointly rather than separately. By virtue of joint inference, the segmentation-and-labeling model 300 takes advantage of the complementary supervisory signals for segmentation and topic inference, considers the contribution of multiple sentences (or other text portions) in a segment to the segment label, and avoids committing to early errors in low-level inference.

The sentence encoder 304 can be any suitable sentence encoder. In an example, the sentence encoder 304 is a concat-pooled bidirectional LSTM. The sentence encoder 304 receives the set of input text 302 as embedded words. The sentence encoder 304 concatenates hidden states at a last time step with a max-pooled and a mean-pooled representation of the hidden states. An output of the sentence encoder 304 is a set of vectors of encoded sentences. Encodings 312 are examples of an encoded sentence set that are outputted by the sentence encoder 304.

The segment predictor LSTM 306, which is used to implement the segmentation network, is a bidirectional LSTM that predicts segment boundaries within the document. The segment predictor LSTM 306 receives the encodings 312 and predicts an indicator variable using a binary cross entropy loss. The indicator variable indicates a class for each of the encodings 312. In an example, the segment predictor LSTM 306 predicts one of two classes corresponding to whether each of the encodings 312 is a start of a new segment or not. For example, encodings 312 that correspond to a start of a new segment are labeled with a "B" in FIG. 3 and encodings 312 that do not correspond to a start of a new segment are labeled with an "I" in FIG. 3.

A segment predictor LSTM 306 or other segmentation network can, in some embodiments, be implemented in a manner that does not rely on measures of coherence to predict segments. Instead, these embodiments of the segmentation network use signals in a sentence or text portion to learn segment bounds. An example of these signals is a cue phrase (e.g., the words "now" or "well").

The pooling network 308 receives the encodings 312 for a predicted segment. The pooling network 308 may be any suitable sequence-to-vector pooling function, such as averaging. In an example, the pooling network 308 is a concat-pooled LSTM, which is further described in FIG. 4. A different concat-pooled LSTM may be used for each predicted segment.

In this example, the encodings 312 corresponding to a first segment may be input to a first instance of a concat-pooled LSTM and the encodings 312 corresponding to a second segment may be input to a second instance of concat-pooled LSTM, where the first and second instances of the concat-pooled LSTM form, at least in part, the pooling network 308. The pooling network 308 applies a pooling function to generate a vector usable for predicting one or more labels for each sentence. The labels can correspond to a topic for each sentence. For example, labels may include history, geography, politics, and the like. The segmentation-and-labeling model 104 applies a classifier 314 to a vector outputted by the pooling network to generate one or more labels for a segment.

The pooling network 308 outputs the segmented and labeled output document 310. The segmented and labeled output document 310 includes, or is at least associated with, metadata generated with the segmentation-and-labeling model 300. The generated metadata includes segmentation metadata identifying the predicted segments and topic metadata identifying labels. The metadata for the segmented and labeled output document 310 is usable by a software tool, such as an e-reader application or a text editing application, to generate bookmarks, headings, or other interface elements for organizing different portions of text or navigating to different portions of text.

Figure 4:
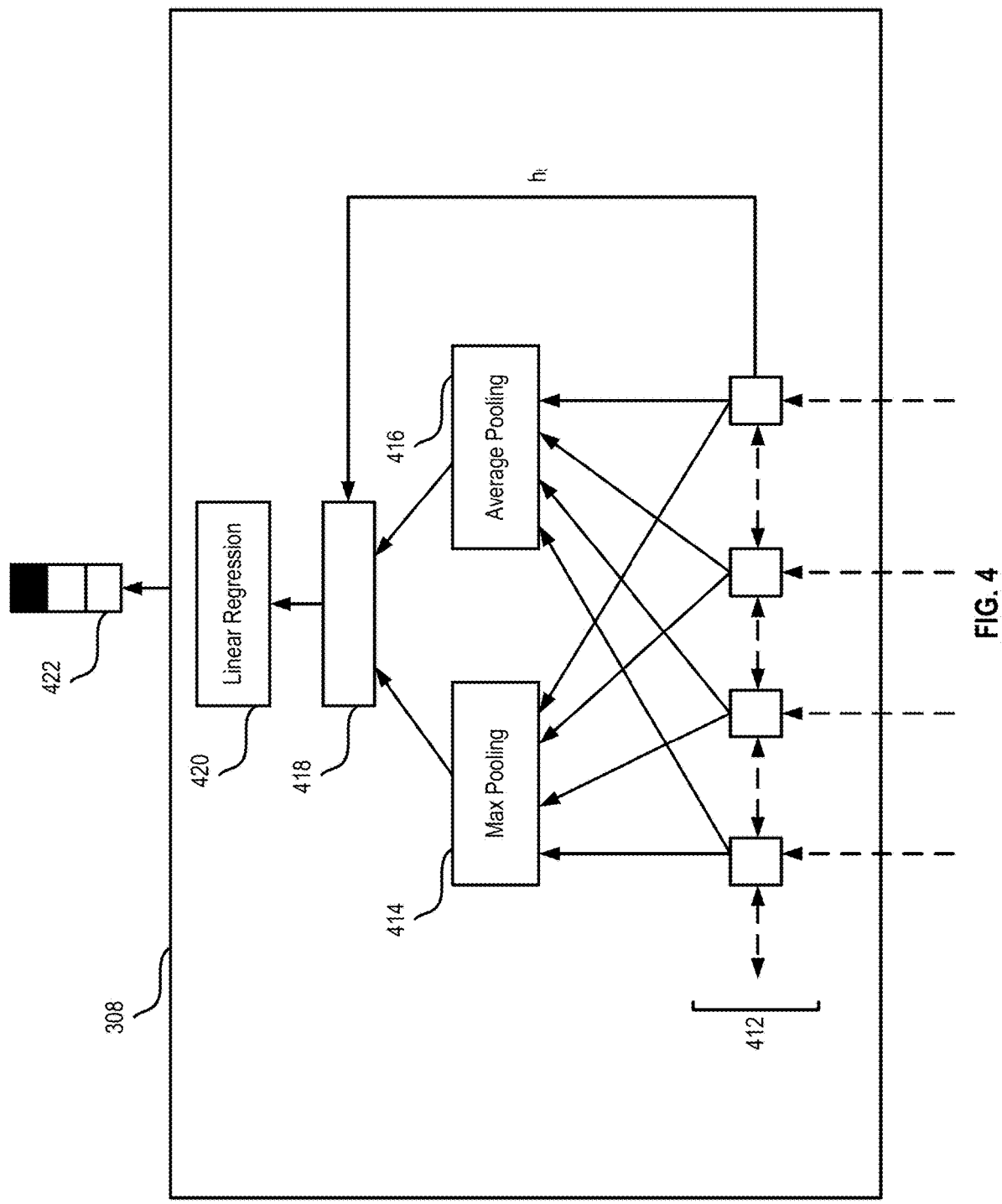
FIG. 4 depicts an example of an architecture for implementing a pooling network that is included in the segmentation-and-labeling model of FIG. 3, according to certain embodiments described in the present disclosure.

FIG. 4 depicts an example of the pooling network 308 that the segmentation-and-labeling model 300 uses to generate a label prediction 422 for a segment of a document. The pooling network 308 includes LSTM cells 412, max pooling 414, average pooling 416, a concatenation operator 418, and a linear regression operator 420. Each of the LSTM cells 412 of the pooling network 308 receives an encoded sentence from a segment along with one or more hidden states outputted by adjacent LSTM cells 412.

The max pooling 414 and average pooling 416 perform pooling functions over the hidden states $H=\{h_1 \ldots h_t\}$ generated by applying the LSTM cells 412 to the encoded sentence set, where t is the number of encoded sentences in a given segment. The max pooling 414 calculates a maximum of the hidden states and thereby generates a max-pooled representation maxpool (H). The average pooling 416 calculates a mean of the hidden states generates a mean-pooled representation meanpool (H). For a given encoded sentence set that is grouped into a segment, the concatenation operator 418 concatenates a final hidden state $h_t$ outputted by the final LSTM cell 412 with the max-pooled representation maxpool (H) and the mean-pooled representation meanpool (H). The linear regression operator 420 applies a linear regression to the output of the concatenation operator 418, and thereby computes a label prediction 422 for a given segment. The label prediction 422 is an vector, such as a bag-of-words vector identifying key words in a segment and their frequency of use in the segment. The segmentation-and-labeling model 104 includes, following the pooling network, a classifier that receives this vector as an input and generates a probability distribution for a set of topic labels (e.g., the probabilities of respective topic labels correctly describing the semantic content of the segment). The classifier could be, for example, any suitable model configured for receiving a bag-of-words vector as an input and generating such a probability distribution as an output.

Some embodiments of the segmentation-and-labeling model can improve upon approaches that use labeled segments as training data to learn text segmentation as a supervised task. For instance, such prior supervised approaches, which involve learning only to predict segment bounds, does not necessarily capture the topicality of a segment that is useful for informative labeling. Additionally or alternatively, embodiments of the segmentation-and-modeling network can improve upon approaches in which conditional random field ("CRF") decoding is used with Inside-Outside-Beginning ("IOB") tagging to segment and label text (e.g., for named entity recognition). For instance, CRF-decoded IOB tagging models are more difficult to apply to a multi-label case, such as when a segment or group of segments in a document belongs to multiple topics or when a segment or group of segments in a document needs to be labeled with both a topic and a sub-topic. Segment bounds should be consistent across labels, so the approach of modeling the full transition from $|L| \rightarrow |L|$ (where $|L|$ is the size of the label space, at every time step in CRF-decoded IOB tagging tools is computationally expensive. In contrast, embodiments described herein perform well at multilabel prediction, while also outperforming a neural CRF-decoded model on a single-label labeling task.

In some embodiments, a segmentation-and-labeling model used to perform process 200 can leverage certain properties about text segmentation, such as segment bounds and segment labels containing complementary supervisory signals and segment labels being a product of lower level (e.g., sentence) labels. Furthermore, a segmentation-and-labeling model should not only learn to label from ground-truth segmentations at training time, but should be robust to segmentation errors.

Figure 5:
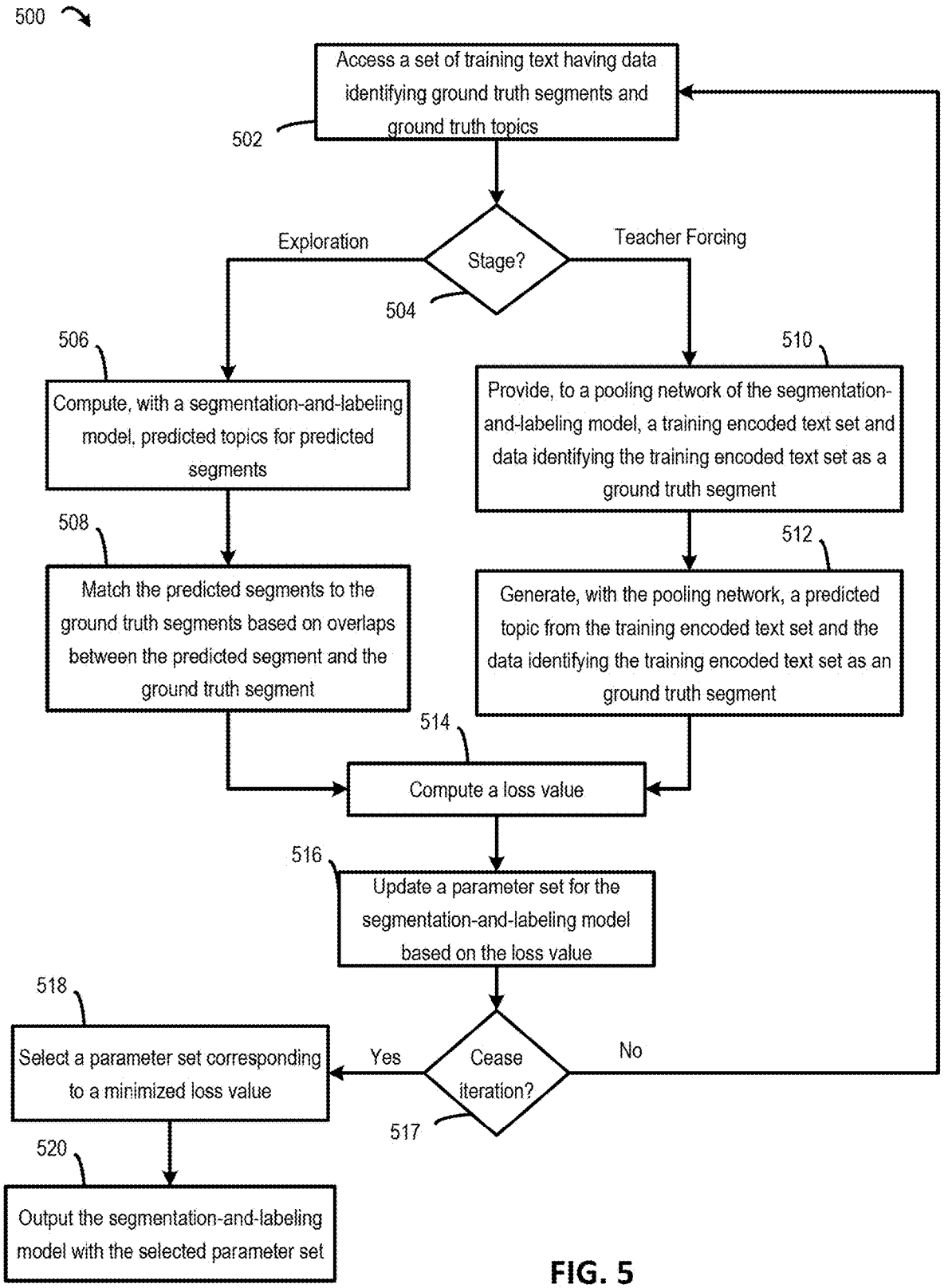
FIG. 5 depicts an example of a process for training a segmentation-and-labeling model to generate a segmented and labeled output document from a set of input text, according to certain embodiments described in the present disclosure.

FIG. 5 depicts an example of a process 500 for training a segmentation-and-labeling model to generate a segmented and labeled output document from a set of input text. In some embodiments, one or more computing devices implement operations depicted in FIG. 5 by executing suitable program code (e.g., code implementing the training engine 122). For illustrative purposes, the process 500 is described with reference to certain examples depicted in the figures. Other implementations, however, are possible.

At block 502, the process 500 involves the training engine 122 accessing a set of training text having data identifying ground truth segments and ground truth topics. For example, training data 124 could include the training text. The training engine 122 accesses the training text by retrieving the training data 124 from a memory device. In some embodiments, the training text includes un-encoded sentences or other text portions, labels or other data identifying groups of the sentences or other text portions as ground truth segments, and labels or other data identifying the groups of the sentences or other text portions as describing ground truth topics. In some embodiments, data identifying the groups of the sentences or other text portions as describing ground truth topics could include, in addition to or instead of user-provided labels, topic headings within a document. In additional or alternative embodiments, the training text includes un-encoded sentence sets that are encoded versions of sentences or other text portions, labels or other data identifying groups of the sentences or other text portions as ground truth segments, and labels or other data identifying the groups of the sentences or other text portions as describing ground truth topics.

At block 504, the process 500 involves the training engine 122 determining whether the training engine 122 should perform an exploration phase or a teacher forcing phase. If the training engine 122 selects the exploration phase at block 504, then the process 500 proceeds to block 506. If the training engine 122 selects the teacher forcing phase at block 504, then the process 500 proceeds to block 510.

The training engine 122 can perform the determination at block 504 in any suitable manner. In some embodiments, the training engine 122 selects between the exploration phase and the teacher forcing phase based on the performance of the segmentation network. For instance, the training engine 122 can use teacher-forcing at a first stage of training when a segmentation prediction network (e.g., segment predictor LSTM 306) performs poorly. This poor performance could be indicated by larger magnitudes of segmentation loss values computed for the segmentation network. A segmentation loss value is computed with a loss function $L_{seg}(X, y_{seg}; \theta_{seg})$, where X is a set of input text, $y_{seg}$ is a set of predicted topic labels for the input text, and $\theta_{seg}$ is the set of parameter values for the segmentation network. The segmentation loss includes the ground truth segmentations and the predicted segmentations, and model parameters that influence segmentation. In an example, the model parameters that influence segmentation include sentence encoder parameters and segment predictor LSTM parameters.

At block 504, the training engine 122 can determine whether the segmentation loss value computed with $L_{seg}$ have satisfied a condition for switching from teacher-forcing to exploration. Examples of this condition being satisfied include the segmentation loss values converging over multiple iterations of the process 500, the segmentation loss value decreasing below a threshold, the segmentation loss value reaching a minimum value, etc. If this condition is satisfied, the training engine 122 selects the exploration phase at block 504.

Blocks 506 and 508 can implement an exploration phase of a training process. At block 506, the process 500 involves the training engine 122 computing, with a segmentation-and-labeling model, predicted topics for predicted segments. The training engine 122 computes the predicted segments with a segmentation network of the segmentation-and-labeling model and computes the predicted topics with a pooling network of the segmentation-and-labeling model. Examples of computing the predicted segments and the predicted topics are described above with respect to FIGS. 1-4.

At block 508, the process 500 involves the training engine 122 matching the predicted segments to the ground truth segments based on overlaps between the predicted segment and the ground truth segment. In some embodiments, the training engine 122 performs the matching in one or more phases. A first phase could include matching ground truth segments to overlapping predicted segments. In a simplified example, the training engine 122 identifies, for a first ground truth segment, a first predicted segment having a larger degree of overlap with respect to the first ground truth segment than another predicted segment. The training engine 122 assigns a first ground truth topic of the first ground truth segment to the first predicted segment. Furthermore, in a second phase, the training engine 122 identifies a second predicted segment to which no ground truth topic was assigned in the first phase. The training engine 122 also identifies, for the second predicted segment, a second ground truth segment having a larger degree of overlap with respect to the second predicted segment than another ground truth segment. The training engine 122 assigns a second ground truth topic of the second ground truth segment to the second predicted segment.

The training engine 122 performs this matching operation because, for example, the training process depicted in FIG. 5 could require that a topic label must be generated for each predicted segment. But, in a given iteration of the training process, the parameters of the segmentation-and-labeling model 104 could result in incorrect predictions of segments. In the context of process 500, this incorrect prediction of a segment could be that a ground-truth topic label for a given portion of training text (e.g., an encoded sentence set) accessed at block 502 might differ from a predicted topic label computed for that portion of training text that is computed at block 506.

For instance, an input text could include four "true" sections (e.g., paragraphs, headers), and those four sections have four ground truth labels. If a given sentence in one of the four "true" sections is assigned to an incorrect predicted segment, then the label that is ultimately applied to that sentence (i.e., the label applied to the predicted segment including that sentence) would be incorrect. From a training perspective, that error in labeling the sentence could result from of a deficiency in the segmentation network's ability or a deficiency in the pooling network's ability to predict a label.

The training engine 122 addresses this issue, at block 508, using an aligner. The aligner is a software tool used to back-propagate a loss indicating an error in the pooling network's prediction of a label. The training engine 122 may use various alignment techniques, such as a many-to-many alignment, which ensures every ground truth and every predicted segment is accounted for at least once. In many-to-many alignment, the training engine 122 aligns and maps each ground truth segment to the maximum overlapping predicted segment. In an example of the many-to-many alignment, the aligner, in the first phase, selects a ground truth segment, finds the maximally overlapping predicted segment, and assigns a ground truth label for the ground truth segment to the maximally overlapping predicted segment. The training engine 122 computes a loss based on a difference between the predicted label for the maximally overlapping predicted segment and the ground truth label that is assigned to the maximally overlapping predicted segment. The training engine 122 repeats this process, in the first phase, until losses have been computed for all available ground truth segments.

Continuing with this example, the first phase may not compute losses for certain predicted segments. For instance, if there are four ground truth segments and five predicted segments, then only four of the five predicted segments will be matched, in the first phase, to the ground truth segments. The fifth predicted segment is considered to be an unmatched predicted segment because it did not have a ground truth label assigned to it in the first phase.

To address this issue, in the second phase, the aligner selects an unmatched predicted segment and aligns the unmatched predicted segment to a ground truth segment. In the many-to-many alignment example, the aligner finds the maximally overlapping ground truth segment and assigns a ground truth label for the maximally overlapping ground truth segment to the unmatched predicted segment. The training engine 122 computes a loss based on a difference between the predicted label for the unmatched predicted segment and the ground truth label that is assigned to the unmatched segment.

Blocks 510 and 512 can implement the teacher-forcing phase of a training process. For instance, at block 510, the process 500 involves the training engine 122 providing, to a pooling network of the segmentation-and-labeling model, a training encoded text set (e.g., a set of encoded sentences) and data identifying the training encoded text set as a ground truth segment. For instance, the training engine 122 ignores the output of the segmentation network (e.g., predicted B and I tags) and uses ground truth topic labels at block 502 as inputs, along with encoded sentence sets, to the pooling network.

At block 512, the process 500 involves the training engine 122 generating, with the pooling network, a predicted topic from the training encoded text set and the data identifying the training encoded text set as a ground truth segment. Examples of computing the predicted topics are described above with respect to FIGS. 1-4.

At block 514, the process 500 involves the training engine 122 computing a loss value. For example, the training engine 122 computes a loss value for a given iteration using a multi-task loss function. The multi-task loss function includes an interpolation between a segmentation loss computed with the segmentation loss function $L_{seg}(X, y_{seg}; \theta_{seg})$, described above, and a topic loss computed with a topic loss function $L_{cls}(X, y_{cls}; \theta_{cls}, \text{aligner})$. In this example, the term $y_{cls}$ includes the predicted topic labels, and the term $y_{cls}$ represents model parameters that influence topic labeling. In an example, the model parameters that influence topic labeling include sentence encoder parameters and pooling network parameters. The topic loss function also includes the aligner term to indicate how the multi-task loss function computes the segmentation labeling loss in an exploration phase of the training process. The multi-task loss function also includes an attention parameter $\alpha$, the value of which can be experimentally determined, to indicate a weight for the segmentation loss and a weight for the topic loss.

An example of the multi-task loss function L(X, y; θ) is L(X, y; θ)=α·L$_{seg}$(X, y$_{seg}$; θ$_{seg}$)+(1−α)·L$_{cls}$(X, y$_{cls}$θ$_{cls}$, aligner). Here, the term y represents the set of topic labels and topic labels (e.g., y$_{seg}$ and y$_{cls}$) and the term θ represent the parameters of the segmentation-and-labeling model 104, such as θ$_{seg}$ and θ$_{cls}$ as well as any parameters for encoders used to generate word embeddings and/or encoded sentences. An example of the segmentation loss function L$_{seg}$ is $$L_{seg} = -\frac{1}{N}\sum_{i=1}^{N} y_i * \log \hat{y}_{seg,i} + (1 - y_{seg,i}) * (1 - \log \hat{y}_{seg,i}),$$

where N is the number of training samples. An example of the topic loss function L$_{cls}$ is $$L_{cls} = -\frac{1}{N}\sum_{i=1}^{N} y_i * \log \hat{y}_{cls,i} + (1 - y_{cls,i}) * (1 - \log \hat{y}_{cls,i}),$$

where N is the number of training samples.

At block 516, the process 500 involves the training engine 122 updating a parameter set for the segmentation-and-labeling model based on the loss value. For instance, the training engine 122 modifies one or more parameters of the pooling network, one or more parameters of the encoders used to generate word embeddings and/or encoded sentences, or some combination thereof. In a teacher-forcing phase, the training engine 122 may update parameters of the segmentation network without updating parameters of the pooling network. In a teacher-forcing phase, the training engine 122 may update parameters of the pooling network without updating parameters of the segmentation network, or may update parameters of both the pooling network and the segmentation network.

At block 517, the process 500 involves the training engine 122 determining whether to cease the iteration of the process 500. If the iteration is to continue, the process 500 returns to block 502. If the iteration is to cease, the process 500 proceeds to block 518.

At block 518, the process 500 involves the training engine 122 selecting, for the segmentation-and-labeling model, a parameter set corresponding to a minimized loss value. For instance, the training engine 122 uses the loss values to identify a desirable set of parameter values for the segmentation-and-labeling model 104. For instance, the training engine 122 identifies one of the loss values having a magnitude that is less than one or more other loss values, such as an output of the multi-loss function having a minimum magnitude with respect to the set of iterations of the process 500. The training engine 122 selects the parameter values of the segmentation-and-labeling model 104 for the iteration of the training process that resulted in the identified loss value (e.g., the minimum loss value). The training engine 122 uses the selected parameter values as the configuration of the segmentation-and-labeling model 104 to be outputted from the trained process.

At block 520, the process 500 involves the training engine 122 outputting the segmentation-and-labeling model with the selected parameter set. In some embodiments, outputting the segmentation-and-labeling model involves the training engine 122 configuring a first computing system, such as a computing device in a training system 120, to transmit program code, data, or both that implement the trained segmentation-and-labeling model to a second computing system, such as a computing device in a text-processing system 102. In additional or alternative embodiments, outputting the segmentation-and-labeling model involves the training engine 122 configuring a first computing system, such as a computing device in a training system 120, to store program code, data, or both that implement the trained segmentation-and-labeling model in a location on a non-transitory computer-readable medium that is accessible to a second computing system, such as a computing device in a text-processing system 102.

Figure 6:
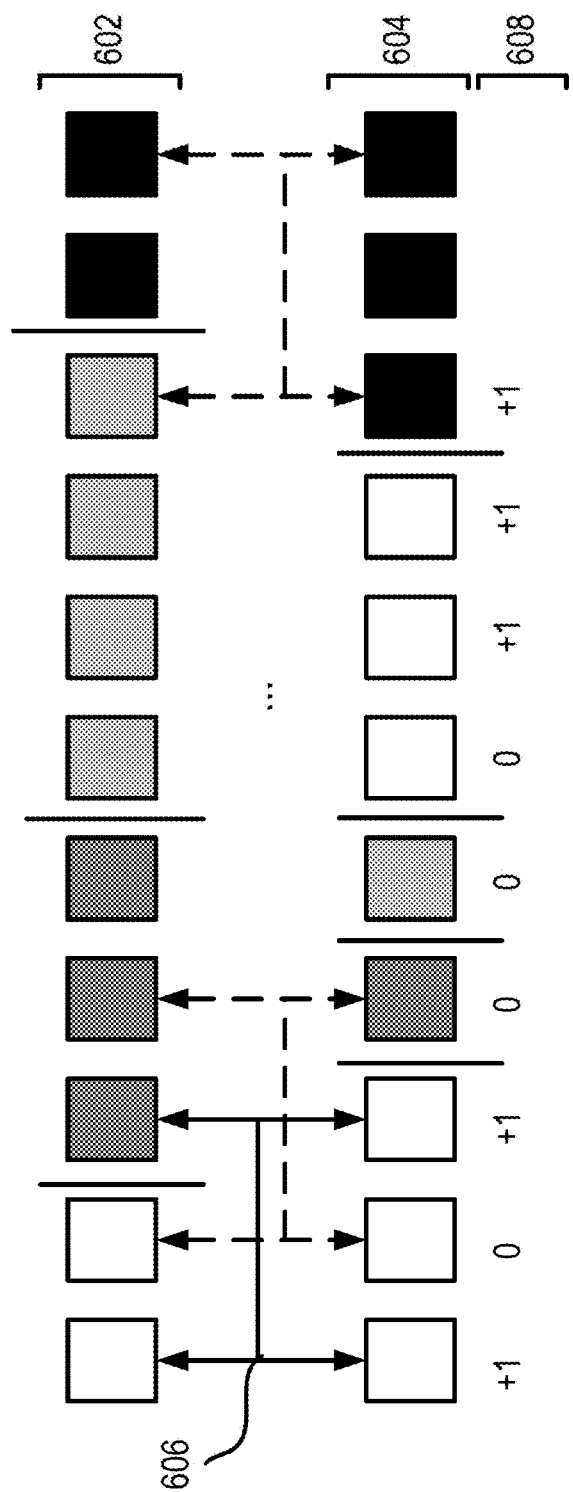
FIG. 6 depicts an example of an approach for evaluating a segmentation-and-labeling model, according to certain embodiments described in the present disclosure.

FIG. 6 depicts an example of an approach for evaluating a segmentation-and-labeling model. Ground truth segments 602 are compared to predicted segments 604. In FIG. 6, each shade corresponds to a different label. The approach involves calculating a probabilistic measure ($P_k$), where k is a length of a sliding window 606, and may be set to half the average size of ground truth segments 602. In this example, half the average size of the ground truth segments 602 is three, so k is three.

The sliding window 606 is run over the segments 602 and 604 to determine $P_k$. At each position, a counter 608 is incremented when items are in the same segment in the ground truth segments 602, but not in the predicted segments 604. The counter 608 is additionally incremented when items are in different segments in the ground truth segments 602, but not in the predicted segments 604. For example, at a first position of the sliding window 606, the ground truth segments 602 are in different segments, but the predicted segments 604 are in the same segment. Therefore, the counter 608 is incremented. This is repeated at each position of the sliding window 606.

Once the sliding window 606 is run over the ground truth segments 602 and 604, a value of the counter 608 is determined by summing the increments of the counter 608. In this example, the value is five. The value of $P_k$ is calculated by dividing the value of the counter 608 by a total number of measures taken. In this example, the total number of measures taken is nine, so $P_k$ is 0.555. A lower $P_k$ indicates a more accurate segmentation-and-labeling model.

Figure 7:
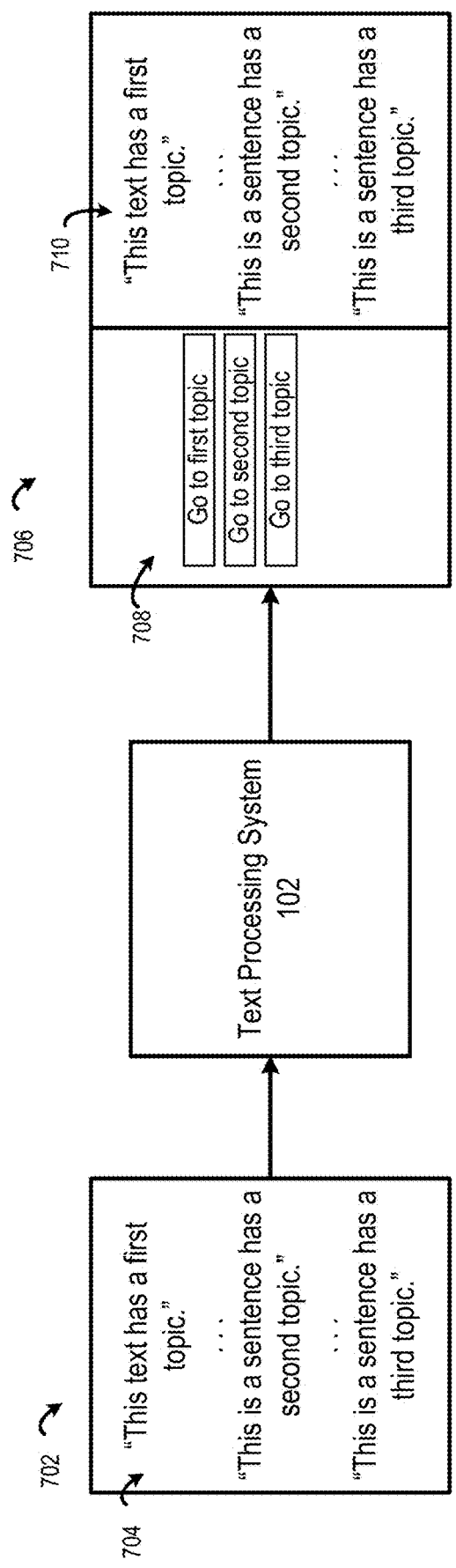
FIG. 7 depicts an example of a user interface generated by a text processing system that uses a segmentation-and-labeling model, according to certain embodiments described in the present disclosure.

FIG. 7 depicts an example of using a segmentation-and-labeling model to facilitate navigation within an electronic document. In this example, a graphical interface 702, which could be generated or updated with a user interface engine 106 or other suitable software, includes a text display section 704 in which input text is displayed. This input text could be obtained, for example, from an input document 116. In this simplified example, the input text includes three segments having different topics, where a first segment includes a first sentence (e.g., "This text has a first topic."), a second segment includes a second sentence (e.g., "This text has a second topic."), and a third segment includes a third sentence (e.g., "This text has a third topic.").

Continuing with this example, the text-processing system 102 applies the segmentation-and-labeling model 104 to the input text and generates an output document having segmentation metadata and topic metadata. The software tool that displays the input text displays an updated graphical interface 706 having a text display section 710 in which the input text is displayed and a navigation section 708. In this example, the software tool uses the segmentation metadata and the topic metadata to generate the interface elements in the navigation section 708. For instance, the navigation section 708 includes a first interface element (e.g., a bookmark interface element) for navigating to the first sentence within text display section 710, a second interface element (e.g., a bookmark interface element) for navigating to the second sentence within text display section 710, and a third interface element (e.g., a bookmark interface element) for navigating to the third sentence within text display section 710. The software tool determines the number of interface elements to include, as well their corresponding navigation locations within the displayed text, by referencing the segmentation metadata of the output document.

Each of the interface elements in the navigation section 708 is includes text identifying a topic of the associated segment to which the interface element navigates. In this simplified example, the first interface element displays text identifying the first topic (e.g., "Go to first topic"), the second interface element displays text identifying the second topic (e.g., "Go to second topic"), and the third interface element displays text identifying the third topic (e.g., "Go to third topic"). The software tool determines the text to include in the interface element by referencing the topic metadata of the output document.

Example of a Computing System for Implementing Certain Embodiments

Figure 8:
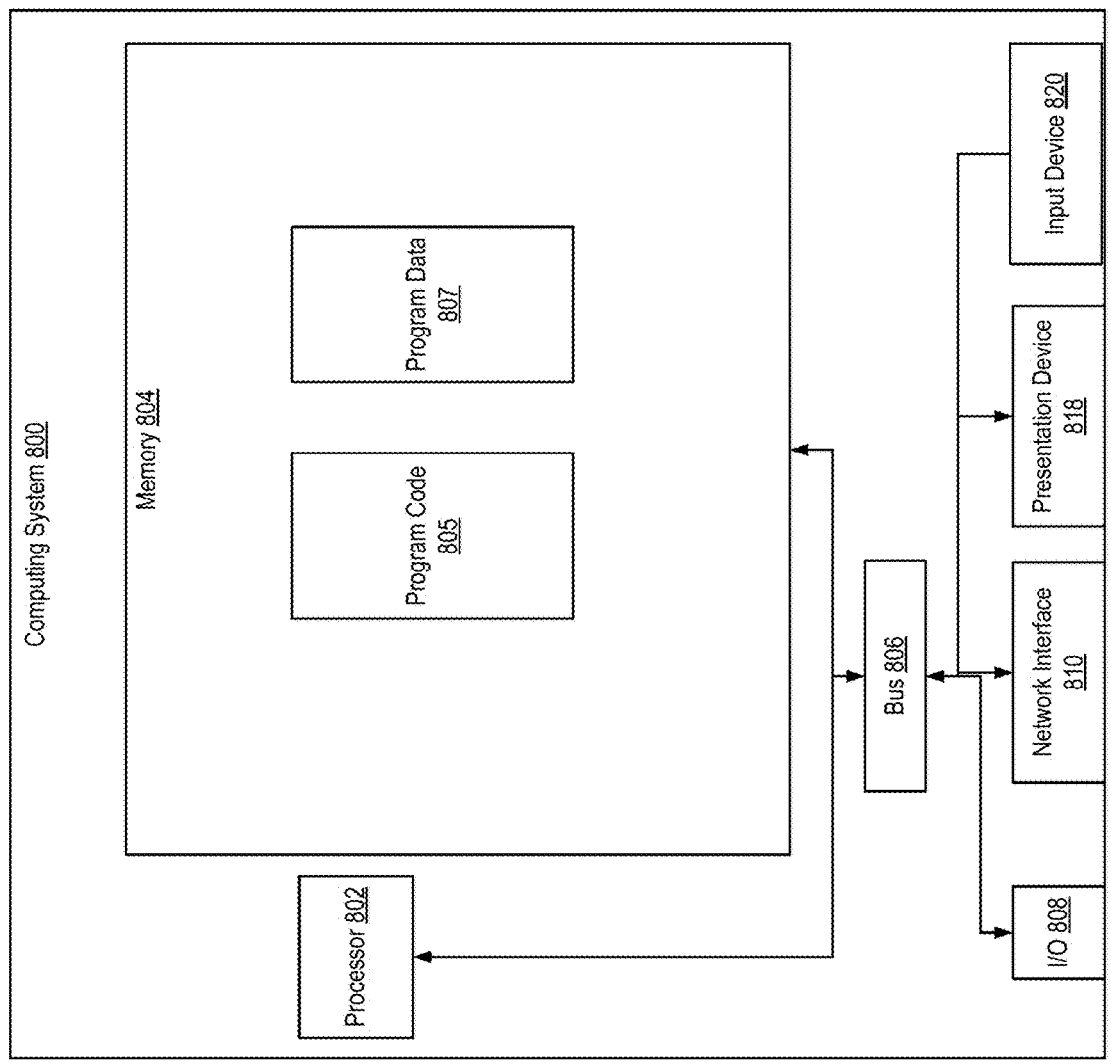
FIG. 8 depicts an example of a computing system for implementing certain embodiments described in the present disclosure.

Any suitable computing system or group of computing systems can be used for performing the operations described herein. For example, FIG. 8 depicts an example of the computing system 800. The implementation of computing system 800 could be used for one or more of a text-processing system 102, a user device 118, and a training system 120. In other embodiments, a single computing system 800 having devices similar to those depicted in FIG. 8 (e.g., a processor, a memory, etc.) combines the one or more operations and data stores depicted as separate systems in FIG. 1.

The depicted example of a computing system 800 includes a processor 802 communicatively coupled to one or more memory devices 804. The processor 802 executes computer-executable program code stored in a memory device 804, accesses information stored in the memory device 804, or both. Examples of the processor 802 include a microprocessor, an application-specific integrated circuit ("ASIC"), a field-programmable gate array ("FPGA"), or any other suitable processing device. The processor 802 can include any number of processing devices, including a single processing device.

A memory device 804 includes any suitable non-transitory computer-readable medium for storing program code 805, program data 807, or both. A computer-readable medium can include any electronic, optical, magnetic, or other storage device capable of providing a processor with computer-readable instructions or other program code. Non-limiting examples of a computer-readable medium include a magnetic disk, a memory chip, a ROM, a RAM, an ASIC, optical storage, magnetic tape or other magnetic storage, or any other medium from which a processing device can read instructions. The instructions may include processor-specific instructions generated by a compiler or an interpreter from code written in any suitable computer-programming language, including, for example, C, C++, C#, Visual Basic, Java, Python, Perl, JavaScript, and ActionScript.

The computing system 800 may also include a number of external or internal devices, an input device 820, a presentation device 818, or other input or output devices. For example, the computing environment 100 is shown with one or more input/output ("I/O") interfaces 808. An I/O interface 808 can receive input from input devices or provide output to output devices. One or more buses 806 are also included in the computing system 800. The bus 806 communicatively couples one or more components of a respective one of the computing system 800.

The computing system 800 executes program code 805 that configures the processor 802 to perform one or more of the operations described herein. Examples of the program code 805 include, in various embodiments, modeling algorithms executed by the text-processing system 102 (e.g., functions of the segmentation-and-labeling model 104), the user interface engine 106, the training engine 122, or other suitable applications that perform one or more operations described herein. The program code may be resident in the memory device 804 or any suitable computer-readable medium and may be executed by the processor 802 or any other suitable processor.

In some embodiments, one or more memory devices 804 store program data 807 that includes one or more datasets and models described herein. Examples of these datasets include interaction data, training data, parameter values, etc. In some embodiments, one or more of data sets, models, and functions are stored in the same memory device (e.g., one of the memory devices 804). In additional or alternative embodiments, one or more of the programs, data sets, models, and functions described herein are stored in different memory devices 804 accessible via a data network.

In some embodiments, the computing system 800 also includes a network interface device 810. The network interface device 810 includes any device or group of devices suitable for establishing a wired or wireless data connection to one or more data networks. Non-limiting examples of the network interface device 810 include an Ethernet network adapter, a modem, and/or the like. The computing system 800 is able to communicate with one or more other computing devices (e.g., a user device) via a data network using the network interface device 810.

In some embodiments, the computing system 800 also includes the input device 820 and the presentation device 818 depicted in FIG. 8. An input device 820 can include any device or group of devices suitable for receiving visual, auditory, or other suitable input that controls or affects the operations of the processor 802. Non-limiting examples of the input device 820 include a touchscreen, a mouse, a keyboard, a microphone, a separate mobile computing device, etc. A presentation device 818 can include any device or group of devices suitable for providing visual, auditory, or other suitable sensory output. Non-limiting examples of the presentation device 818 include a touchscreen, a monitor, a speaker, a separate mobile computing device, etc.

Although FIG. 8 depicts the input device 820 and the presentation device 818 as being local to the computing device that executes the text-processing system 102, other implementations are possible. For instance, in some embodiments, one or more of the input device 820 and the presentation device 818 can include a remote client-computing device that communicates with the computing system 800 via the network interface device 810 using one or more data networks described herein.

Experimental Results

In experimentation involving embodiments described herein, an S-LSTM for implementing certain embodiments was evaluated for the tasks of document segmentation and topic labeling. The experimentation was performed using a WikiSection dataset, which contains Wikipedia articles across two languages (English and German) and domains (Cities and Diseases). Articles were segmented using the Wikipedia section structure, and the heading of each segment was retained, as well as a normalized label for each heading type (e.g. "history," "demography"), drawn from a restricted label vocabulary. The experimentation involved two tasks: (1) jointly segmenting an input document and assign a single restricted-vocabulary label to each segment; and (2) predicting, as a topic label, a bag-of-terms in the title of the Wikipedia section. The assigned single restricted-vocabulary labels for the first task were drawn from a fixed label set. The predicted topic labels in the second task align more closely with learning to segment and label from naturally labeled data, such as contracts or Wikipedia articles, which can be transferred to segment other document types.

Various datasets were used in the experimentation. A Wiki-50 dataset used in the experimentation contains 50 randomly sampled Wikipedia articles, segmented and with their headers. A Cities and Elements datasets used in the experimentation include two additional small Wikipedia datasets with both segmentation and segmentation headers. A Clinical Textbook dataset, which has segment boundaries but no headers, was also used in the experimentation.

The S-LSTM model was evaluated with previous document segmentation and topic labeling approaches on four WikiSection datasets for both single label and multi-label tasks. The four datasets were: (1) Diseases (English), (2) Diseases (German), (3) Cities (English), and (4) Cities (German). In order to understand the effect of the segment pooling and segment exploration strategies, results for simpler baselines for each of these modules were also included. For the segment pooling, a mean pooling for topic labeling was used in some experiments instead of an LSTM. For the segment exploration, only teacher forcing was used in some experiments instead of exploration. Model transferability was evaluated by evaluating the models trained on the English WikiSection tasks on the Cities, Elements, Wiki-50, and Clinical datasets.

A probabilistic measure ($P_k$) was used to evaluate segmentation. Calculating $P_k$ involved running a sliding window of width k over the predicted and ground truth segments, and counting a number of disagreements, where a disagreement involved the ends of the sliding window being in different segments (i.e., a mismatch between the predicted and ground truth segments). The number of disagreements was then divided by the total number of window positions, resulting in a score normalized between 0 and 1. The segmentation results used a k having a value of half the average size of the ground truth segments.

For classification, three different measures were used, depending on the task. For the single label tasks, an $F_1$ and a mean average precision ("MAP") were uses. For the multi-label tasks, a precision at the first rank position (Prec@1) and MAP were reported. Results generated with the C99 algorithm, the TopicTiling algorithm that looks for coherence shifts in topic vectors to find segment bounds, and the TextSeg algorithm were used as segmentation baselines on the WikiSection task. For a neural baseline, a SECTOR model with pre-trained embeddings was used. The SECTOR model predicts a label for each sentence, and then performs post hoc segmentation looking at the coherence of the latent sentence representations, thus addressing segmentation and labeling separately. For the additional datasets, the GraphSeg, BayesSeg, and pre-trained TextSeg and SECTOR models were used. Additionally, an LSTM-LSTM-CRF IOB tagging model was implemented for the single-label experiments since CRF-decoded IOB tagging models are more difficult to apply to the multi-label case.

In the experimentation, the same hyperparameters were used for each task and dataset. The hyperparameters included an Adam optimizer with a learning rate 0.0001 and weight decay 0.9. Dropout was applied after each layer except the final classification layers. A single dropout probability of 0.1 was used for every instance. For models with exploration, teacher forcing was employed for 10 epochs. Model weights were initialized using Xavier normal initialization. All hidden-layer sizes were set to 200. Fixed 300-dimensional FastText embeddings were used for both English and German, and were projected down to 200 dimensions using a trainable linear layer.

The experimentation indicated that a jointly trained S-LSTM model showed improvement over prior methods for model document segmentation and topic labeling tasks separately. Additionally, segment alignment and exploration during training reduced error rates and a segment pooling layer lead to improvements for both segmentation and labeling. Moreover, the S-LSTM model outperformed an IOB-tagging CRF-decoded model for single label topic labeling, and also generalized easily and tractably to multi-labeling. A deeper analysis of the joint modeling demonstrates that topic labeling and segment bound prediction contain complementary information.

Table 1, which is depicted in FIG. 9, includes results of the experimentation with respect to the segmentation task using the WikiSection dataset. In Table 1, the performance of existing approaches is compared to the S-LSTM approach and LSTM-LSTM-CRF that can be used to implement certain embodiments described herein. The existing approaches include C99, TopicTiling, TextSeg, and SECTOR ("SEC>T+emb"). The results demonstrate that the S-LSTM outperformed the LSTM-LSTM-CRF baseline in almost every case for single-labeling, and in every case for segmentation. The only case that outperformed the S-LSTM was the $F_1$ for the LSTM-LSTM-CRF. As a result, the S-LSTM used in the experimentation useful for cases such as clinical segmentation and labeling, where segments are drawn from a small fixed vocabulary. The S-LSTM also generalized to multi-label problems, in contrast to an IOB-tagging LSTM-LSTM-CRF, since the S-LSTM only involves a small change in the loss, from cross-entropy to binary cross-entropy.

Table 2, which is depicted in FIG. 10, includes results of the experimentation with respect to the topic labeling task using the WikiSection dataset. The experimentation reduced $P_k$ by an average of over 30% across the WikiSection datasets. $P_k$ was consistent across three WikiSection tasks, and did not degrade when going from the topic prediction to header prediction tasks. The segmentation did not get worse between heading prediction and topic prediction, as SECTOR segmentation did.

The results additionally showed an additional classification gain resulted from allowing the segmentation-and-labeling model to explore recovering from segmentation errors. Exploration allowed the segmentation-and-labeling model to optimize more closely to how it is being evaluated. The teacher forcing was useful at the beginning of model training. When training variants of S-LSTM that did not use teacher forcing at the beginning, which instead could explore the bad segmentation, the segmentation failed to converge and the segmentation-and-labeling model performed universally poorly.

Figure 11:
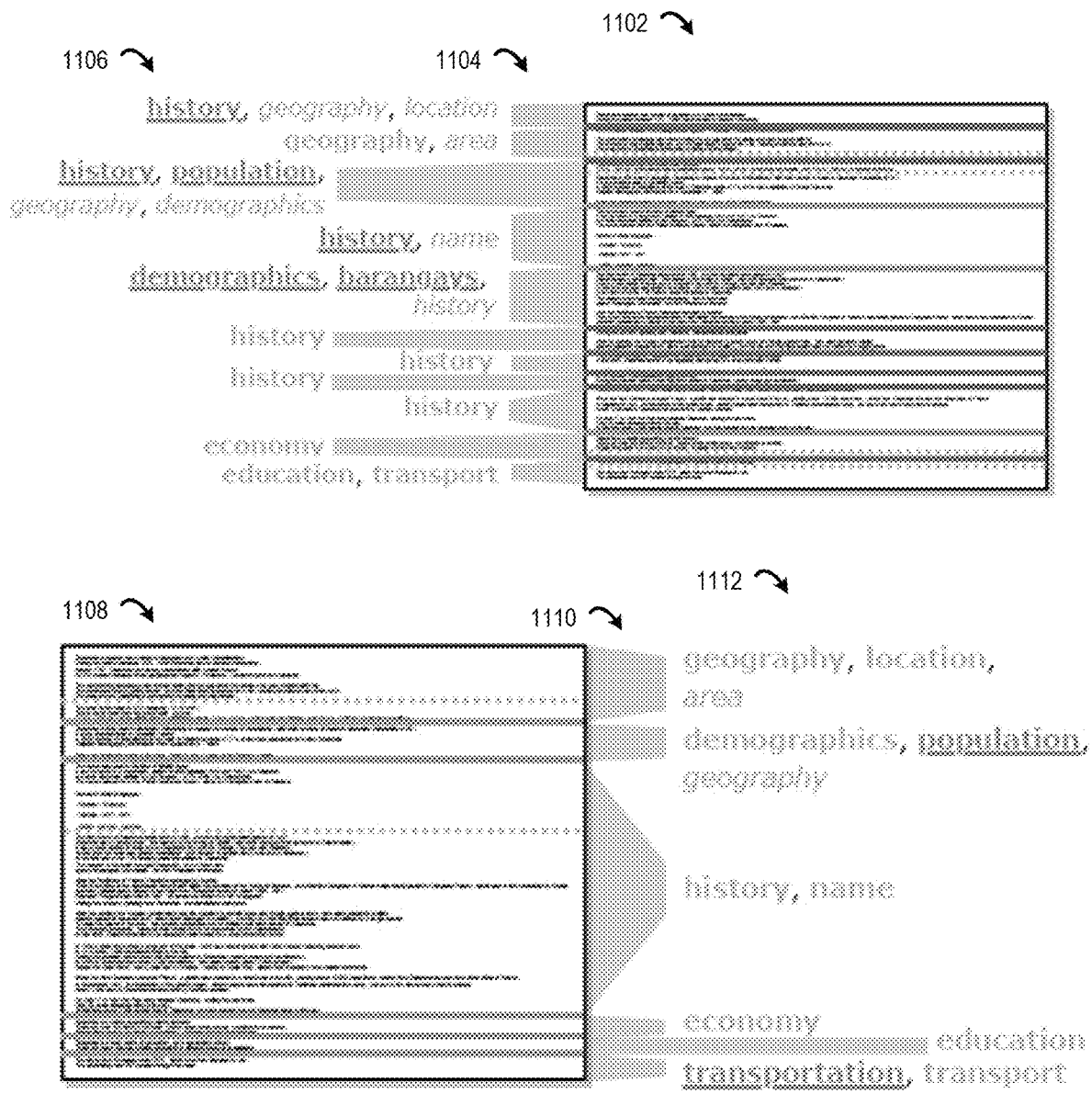
FIG. 11 depicts an example comparing experimental results generated using prior techniques with experimental results using certain embodiments described in the present disclosure.

FIG. 11 depicts an example comparing a segmented and labeled document 1102, where segments 1104 and topic labels 1106 are generated with a prior technique (i.e., a SECTOR model), to a segmented and labeled document 1108, where segments 1110 and topic labels 1112 are generated with the S-LSTM. Green lines in the segmented and labeled documents 1102 and 1108 are correctly predicted segments 1104 and 1110, red lines are false positive bound predictions, and yellow dashed lines are false negatives. The S-LSTM predicted more correct segments 1110 than the prior technique. Additionally, the S-LSTM did not predict any false positive segments 1110, whereas the prior technique predicted seven false positive segments 1104. For each segment, the top two predicted topic labels 1106 and 1112 are also shown. The topic labels 1106 and 1112 are in bold text if they appear in the maximally overlapping segment in the ground truth, underlined if they are false positive terms, and italicized if they are false negatives.

Using the S-LSTM involved only a small number of labeling errors compared with the prior technique, which predicted more false positives and false negatives than the S-LSTM. In general, the S-LSTM provided a more accurate and less noisy segmented and topic-labeled document 1108 compared to the prior technique. This improved segmentation and topic labeling as compared to a SECTOR model can be achieved by using separate LSTMs for segmentation and pooling. The SECTOR approach, by contrast, uses a single LSTM to predict topic labels from text without utilizing any data identifying segments within the text, and does not use pooling to smooth out the segment prediction that is performed using the predicted topic labels.

General Considerations

Numerous specific details are set forth herein to provide a thorough understanding of the claimed subject matter. However, those skilled in the art will understand that the claimed subject matter may be practiced without these specific details. In other instances, methods, apparatuses, or systems that would be known by one of ordinary skill have not been described in detail so as not to obscure claimed subject matter.

Unless specifically stated otherwise, it is appreciated that throughout this specification discussions utilizing terms such as "processing," "computing," "calculating," "determining," and "identifying" or the like refer to actions or processes of a computing device, such as one or more computers or a similar electronic computing device or devices, that manipulate or transform data represented as physical electronic or magnetic quantities within memories, registers, or other information storage devices, transmission devices, or display devices of the computing platform.

The system or systems discussed herein are not limited to any particular hardware architecture or configuration. A computing device can include any suitable arrangement of components that provide a result conditioned on one or more inputs. Suitable computing devices include multipurpose microprocessor-based computer systems accessing stored software that programs or configures the computing system from a general purpose computing apparatus to a specialized computing apparatus implementing one or more embodiments of the present subject matter. Any suitable programming, scripting, or other type of language or combinations of languages may be used to implement the teachings contained herein in software to be used in programming or configuring a computing device.

Embodiments of the methods disclosed herein may be performed in the operation of such computing devices. The order of the blocks presented in the examples above can be varied—for example, blocks can be re-ordered, combined, and/or broken into sub-blocks. Certain blocks or processes can be performed in parallel.

The use of "adapted to" or "configured to" herein is meant as open and inclusive language that does not foreclose devices adapted to or configured to perform additional tasks or steps. Additionally, the use of "based on" is meant to be open and inclusive, in that a process, step, calculation, or other action "based on" one or more recited conditions or values may, in practice, be based on additional conditions or values beyond those recited. Headings, lists, and numbering included herein are for ease of explanation only and are not meant to be limiting.

While the present subject matter has been described in detail with respect to specific embodiments thereof, it will be appreciated that those skilled in the art, upon attaining an understanding of the foregoing, may readily produce alternatives to, variations of, and equivalents to such embodiments. Accordingly, it should be understood that the present disclosure has been presented for purposes of example rather than limitation, and does not preclude the inclusion of such modifications, variations, and/or additions to the present subject matter as would be readily apparent to one of ordinary skill in the art.

The invention claimed is:

1. A method that includes performing, with one or more processing devices, operations comprising:
    selecting a parameter set for a segmentation-and-labeling model based on a loss value corresponding to a difference between (a) a particular predicted topic for a particular predicted segment produced from a set of training text and (b) a ground truth topic that is assigned to a ground truth segment matching the particular predicted segment;
    generating a predicted segment for input text provided to the segmentation-and-labeling model with the parameter set, the predicted segment being generated by, at least, applying a segmentation network of the segmentation-and-labeling model to an encoded text portion set from the input text;
    generating a topic for the predicted segment by, at least, applying a pooling network of the segmentation-and-labeling model to the predicted segment; and generating an output document having the input text, segment metadata identifying the predicted segment, and topic metadata identifying the topic.

2. The method of claim 1, wherein generating the topic by applying the pooling network to the predicted segment comprises:
    receiving the encoded text portion set at an input of the pooling network; and
    applying a concat pooling LSTM that generates an output vector representing a semantic meaning of the encoded text portion set.

3. The method of claim 2, wherein the output vector comprises one or more of a Bag-of-Words vector, a topic distribution vector, or a vector representing a set of classes.

4. The method of claim 2,
    wherein generating the predicted segment by applying the segmentation network to the encoded text portion set comprises:
    generating, with a bidirectional LSTM of the segmentation network, a B tag indicating that a first encoded text portion in the encoded text portion set is a beginning of the predicted segment;
    generating, with the bidirectional LSTM, an I tag indicating that a second encoded text portion in the encoded text portion set is inside of the predicted segment; and
    outputting a set of B and I tags, wherein the set of B and I tags includes the B tag and the I tag;
    wherein generating the topic by applying the pooling network to the predicted segment further comprises:
        accessing the set of B and I tags generated by the segmentation network, grouping the encoded text portion set into the predicted segment using the set of B and I tags, and excluding, from a pooling function that generates the output vector, a different encoded text portion having a different B tag indicating a beginning of a different segment.

5. The method of claim 2, wherein generating the topic further comprises:

applying a classifier to the output vector that generates a distribution of probabilities for the output vector having subject matter included in respective topics; and selecting the topic based on a probability for the topic exceeding a threshold.

6. The method of claim 1, the operations further comprising:

accessing a set of training text having data identifying ground truth segments of the training text and ground truth topics of the ground truth segments;

computing, with the segmentation-and-labeling model, predicted topics for predicted segments;

matching the predicted segments to the ground truth segments, wherein the particular predicted segment is matched to the ground truth segment based on an overlap between the particular predicted segment and the ground truth segment;

computing, based on the matching, the loss value;

updating a parameter set for the segmentation-and-labeling model based on the loss value; and outputting the segmentation-and-labeling model with the parameter set as updated.

7. The method of claim 6, wherein matching the predicted segments to the ground truth segments comprises:

in a first phase:

identifying, for a first ground truth segment, a first predicted segment having a larger degree of overlap with respect to the first ground truth segment than another predicted segment, and assigning a first ground truth topic of the first ground truth segment to the first predicted segment;

in a second phase:

identifying a second predicted segment to which no ground truth topic was assigned in the first phase, identifying, for the second predicted segment, a second ground truth segment having a larger degree of overlap with respect to the second predicted segment than another ground truth segment; and assigning a second ground truth topic of the second ground truth segment to the second predicted segment.

8. The method of claim 7, wherein:

the first phase is iterated for each ground truth segment until all of the ground truth segments have matching first predicted segments, respectively, the second phase is performed after all of the ground truth segments have the matching first predicted segments.

9. The method of claim 6, wherein a training process is performed in an exploration stage and wherein the operations further comprise, prior to providing the input text to a segmentation-and-labeling model, training the segmentation-and-labeling model by performing a teacher-forcing stage comprising:

accessing a set of additional training text having data identifying additional ground truth segments of the additional training text and additional ground truth topics of the additional ground truth segments;

providing, to the pooling network, a training encoded text portion set and data identifying the training encoded text portion set as an additional ground truth segment;

generating, with the pooling network, an additional predicted topic from the training encoded text portion set and the data identifying the training encoded text portion set as the additional ground truth segment; and computing an additional loss value based on a difference between (a) the additional predicted topic and (b) an additional ground truth topic that is assigned to the additional ground truth segment;

wherein the parameter set for the segmentation-and-labeling model is also updated based on the additional loss value and the segmentation-and-labeling model is outputted with the parameter set as updated based on the loss value and the additional loss value.

10. A method that includes performing, with one or more processing devices, operations comprising:

accessing a set of training text having data identifying ground truth segments of the training text and ground truth topics of the ground truth segments;

computing, with a segmentation-and-labeling model, predicted topics for predicted segments;

matching the predicted segments to the ground truth segments, wherein a predicted segment is matched to a ground truth segment based on an overlap between the predicted segment and the ground truth segment;

computing, based on the matching, a loss value, wherein the loss value is computed based on a difference between (a) a predicted topic for the predicted segment and (b) a ground truth topic that is assigned to the ground truth segment to which the predicted segment is matched;

updating a parameter set for the segmentation-and-labeling model based on the loss value; and outputting the segmentation-and-labeling model with the parameter set as updated.

11. The method of claim 10, wherein matching the predicted segments to the ground truth segments comprises:

in a first phase:

identifying, for a first ground truth segment, a first predicted segment having a larger degree of overlap with respect to the first ground truth segment than another predicted segment, and assigning a first ground truth topic of the first ground truth segment to the first predicted segment;

in a second phase:

identifying a second predicted segment to which no ground truth topic was assigned in the first phase, identifying, for the second predicted segment, a second ground truth segment having a larger degree of overlap with respect to the second predicted segment than another ground truth segment; and assigning a second ground truth topic of the second ground truth segment to the second predicted segment.

12. The method of claim 11, wherein:

the first phase is iterated for each ground truth segment until all of the ground truth segments have matching first predicted segments, respectively, the second phase is performed after all of the ground truth segments have the matching first predicted segments.

13. The method of claim 10, wherein the operations further comprise training the segmentation-and-labeling model by performing a teacher-forcing stage comprising:

accessing a set of additional training text having data identifying additional ground truth segments of the additional training text and additional ground truth topics of the additional ground truth segments;

providing, to a pooling network of the segmentation-and-labeling model, a training encoded text portion set and data identifying the training encoded text portion set as an additional ground truth segment;

generating, with the pooling network, an additional predicted topic from the training encoded text portion set and the data identifying the training encoded text portion set as the additional ground truth segment; and computing an additional loss value based on a difference between (a) the additional predicted topic and (b) an additional ground truth topic that is assigned to the additional ground truth segment;

wherein the parameter set for the segmentation-and-labeling model is also updated based on the additional loss value and the segmentation-and-labeling model is outputted with the parameter set as updated based on the loss value and the additional loss value.

14. The method of claim 10, wherein the operations further comprise:

generating an output predicted segment for input text by, at least, applying a segmentation network of the segmentation-and-labeling model to an encoded text portion set from the input text;

generating a topic for the output predicted segment by, at least, applying a pooling network of the segmentation-and-labeling model to the output predicted segment; and generating an output document having the input text, segment metadata identifying the output predicted segment, and topic metadata identifying the topic.

15. A non-transitory computer-readable medium having program code stored thereon, wherein the program code is executable by processing hardware to perform operations comprising:

selecting a parameter set for a segmentation-and-labeling model based on a loss value corresponding to a difference between (a) a particular predicted topic for a particular predicted segment produced from a set of training text and (b) a ground truth topic that is assigned to a ground truth segment matching the particular predicted segment;

accessing input text;

a step for jointly segmenting and labeling the input text as provided to the segmentation-and-labeling model with the parameter set, the input text being jointly segmented and labeled to generate an output document with metadata identifying one or more segments and one or more topics; and outputting the output document.

16. The non-transitory computer-readable medium of claim 15, wherein the step for jointly segmenting and labeling the input text comprises:

generating the particular predicted segment for the input text by, at least, applying a segmentation network of the segmentation-and-labeling model to an encoded text portion set from the input text; and applying a pooling network to an encoded sentence set from the particular predicted segment.

17. The non-transitory computer-readable medium of claim 15, wherein the step for jointly segmenting and labeling the input text comprises:

receiving an encoded text portion set at an input of a pooling network; and applying a concat pooling LSTM that generates an output vector representing a semantic meaning of the encoded text portion set.

18. The non-transitory computer-readable medium of claim 17, wherein the step for jointly segmenting and labeling the input text further comprises:

applying a classifier to the output vector that generates a distribution of probabilities for the output vector having subject matter included in respective topics; and selecting a topic based on a probability for the topic exceeding a threshold.

19. The non-transitory computer-readable medium of claim 17, wherein the step for jointly segmenting and labeling the input text comprises:

generating, with a bidirectional LSTM, a B tag indicating that a first encoded text portion in the encoded text portion set is a beginning of a predicted segment;

generating, with the bidirectional LSTM, an I tag indicating that a second encoded text portion in the encoded text portion set is inside of the predicted segment; and outputting a set of B and I tags, wherein the set of B and I tags includes the B tag and the I tag;

grouping the encoded text portion set into the predicted segment using the set of B and I tags; and excluding, from a pooling function that generates the output vector, a different encoded text portion having a different B tag indicating a beginning of a different segment.

20. The non-transitory computer-readable medium of claim 15, wherein the operations further comprise generating, from the metadata, a graphical interface having interface elements that, when selected, navigate to different segments of the output document within the graphical interface.

* * * * *